(12) United States Patent
Suri et al.

(10) Patent No.: US 12,255,950 B2
(45) Date of Patent: Mar. 18, 2025

(54) DYNAMICALLY UPDATING LOAD BALANCING CRITERIA

(71) Applicant: VMware LLC, Palo Alto, CA (US)

(72) Inventors: Saurav Suri, Bangalore (IN); Sambit Kumar Das, Hayward, CA (US); Shyam Sundar Govindaraj, Santa Clara, CA (US); Sumit Kalra, Gurugram (IN)

(73) Assignee: VMWare LLC, Palo Alto, CA (US)

( * ) Notice: Subject to any disclaimer, the term of this patent is extended or adjusted under 35 U.S.C. 154(b) by 0 days.

(21) Appl. No.: 18/369,809

(22) Filed: Sep. 18, 2023

(65) Prior Publication Data

US 2024/0007522 A1    Jan. 4, 2024

Related U.S. Application Data

(63) Continuation of application No. 17/568,806, filed on Jan. 5, 2022, now Pat. No. 11,811,861.

(30) Foreign Application Priority Data

May 17, 2021 (IN) .............................. 202141022086

(51) Int. Cl.
*H04L 67/1017* (2022.01)
*H04L 61/4511* (2022.01)

(52) U.S. Cl.
CPC ...... *H04L 67/1017* (2013.01); *H04L 61/4511* (2022.05)

(58) Field of Classification Search
CPC .................. H04L 67/1017; H04L 61/4511
See application file for complete search history.

(56) References Cited

U.S. PATENT DOCUMENTS

| RE4,814 E | 3/1872 | Madurell |
| 5,109,486 A | 4/1992 | Seymour |
| (Continued) | | |

FOREIGN PATENT DOCUMENTS

| AU | 2011352884 A1 | 7/2013 |
| CA | 2607005 C | 2/2012 |
| WO | 2020086956 A1 | 4/2020 |

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

(Continued)

*Primary Examiner* — Jimmy H Tran
(74) *Attorney, Agent, or Firm* — Quarles & Brady LLP (57) ABSTRACT

Some embodiments provide a method of performing load balancing for a group of machines that are distributed across several physical sites. The method of some embodiments iteratively computes (1) first and second sets of load values respectively for first and second sets of machines that are respectively located at first and second physical sites, and (2) uses the computed first and second sets of load values to distribute received data messages that the group of machines needs to process, among the machines in the first and second physical sites. The iterative computations entail repeated calculations of first and second sets of weight values that are respectively used to combine first and second load metric values for the first and second sets of machines to repeatedly produce the first and second sets of load values for the first and second sets of machines. The repeated calculation of the weight values automatedly and dynamically adjusts the load prediction at each site without user adjustment of these weight values. As it is difficult for a user to gauge the effect (Continued)

of each load metric on the overall load, some embodiments use machine learned technique to automatedly adjust these weight values.

18 Claims, 6 Drawing Sheets

(56) References Cited

U.S. PATENT DOCUMENTS

| | | | |
|---|---|---|---|
| 5,781,703 A | 7/1998 | Desai et al. |
| 6,148,335 A | 11/2000 | Haggard et al. |
| 6,449,739 B1 | 9/2002 | Landan |
| 6,515,968 B1 | 2/2003 | Combar et al. |
| 6,714,979 B1 | 3/2004 | Brandt et al. |
| 6,754,706 B1 | 6/2004 | Swildens et al. |
| 6,792,458 B1 | 9/2004 | Muret et al. |
| 6,792,460 B2 | 9/2004 | Oulu et al. |
| 6,901,051 B1 | 5/2005 | Hou et al. |
| 6,976,090 B2 | 12/2005 | Ben-Shaul et al. |
| 6,996,778 B2 | 2/2006 | Rajarajan et al. |
| 7,076,695 B2 | 7/2006 | McGee et al. |
| 7,130,812 B1 | 10/2006 | Yer et al. |
| 7,246,159 B2 | 7/2007 | Aggarwal et al. |
| 7,353,272 B2 | 4/2008 | Robertson et al. |
| 7,430,610 B2 | 9/2008 | Pace et al. |
| 7,636,708 B2 | 12/2009 | Garcea et al. |
| 7,701,852 B1 | 4/2010 | Hohn et al. |
| 7,743,380 B2 | 6/2010 | Seidman et al. |
| 7,933,988 B2 | 4/2011 | Nasuto et al. |
| 7,990,847 B1 | 8/2011 | Leroy et al. |
| 8,032,896 B1 | 10/2011 | Li et al. |
| 8,112,471 B2 | 2/2012 | Wei et al. |
| 8,131,712 B1 | 3/2012 | Thambidorai et al. |
| 8,412,493 B2 | 4/2013 | Duchenay et al. |
| 8,499,066 B1 | 7/2013 | Zhang et al. |
| 8,588,069 B2 | 11/2013 | Todd et al. |
| 8,856,797 B1 | 10/2014 | Siddiqui et al. |
| 8,874,725 B1 | 10/2014 | Ganjam et al. |
| 8,977,728 B1 | 3/2015 | Martini |
| 9,032,078 B2 | 5/2015 | Beerse et al. |
| 9,047,648 B1 | 6/2015 | Lekutai et al. |
| 9,071,537 B2 | 6/2015 | Talla et al. |
| 9,083,710 B1 | 7/2015 | Yadav |
| 9,210,056 B1 | 12/2015 | Choudhary et al. |
| 9,256,452 B1 | 2/2016 | Suryanarayanan et al. |
| 9,288,193 B1 | 3/2016 | Gryb et al. |
| 9,300,552 B1 | 3/2016 | Dube et al. |
| 9,300,553 B2 | 3/2016 | Dube et al. |
| 9,319,343 B2 | 4/2016 | Khandelwal et al. |
| 9,329,915 B1 | 5/2016 | Chandrasekharapuram et al. |
| 9,450,700 B1 | 9/2016 | Tonder et al. |
| 9,459,980 B1 | 10/2016 | Arguelles |
| 9,467,476 B1 | 10/2016 | Shieh et al. |
| 9,477,784 B1 | 10/2016 | Bhave et al. |
| 9,483,286 B2 | 11/2016 | Basavaiah et al. |
| 9,491,164 B1 | 11/2016 | Fay et al. |
| 9,495,222 B1 | 11/2016 | Jackson |
| 9,531,614 B1 | 12/2016 | Nataraj et al. |
| 9,535,805 B2 | 1/2017 | Ananthanarayanan et al. |
| 9,558,465 B1 | 1/2017 | Arguelles et al. |
| 9,571,516 B1 | 2/2017 | Curcic et al. |
| 9,608,880 B1 | 3/2017 | Goodall |
| 9,613,120 B1 | 4/2017 | Kharatishvili et al. |
| 9,626,275 B1 | 4/2017 | Hitchcock et al. |
| 9,674,302 B1 | 6/2017 | Khalid et al. |
| 9,680,699 B2 | 6/2017 | Cohen et al. |
| 9,692,811 B1 | 6/2017 | Tajuddin et al. |
| 9,697,316 B1 | 7/2017 | Taylor et al. |
| 9,712,410 B1 | 7/2017 | Char et al. |
| 9,716,617 B1 | 7/2017 | Ahuja et al. |
| 9,729,414 B1 | 8/2017 | Oliveira et al. |
| 9,749,888 B1 | 8/2017 | Colwell et al. |
| 9,798,883 B1 | 10/2017 | Gil et al. |
| 9,817,699 B2 | 11/2017 | Stich et al. |
| 9,830,192 B1 | 11/2017 | Crouchman et al. |
| 9,882,830 B2 | 1/2018 | Taylor et al. |
| 9,935,829 B1 | 4/2018 | Miller et al. |
| 9,959,188 B1 | 5/2018 | Krishnan |
| 9,967,275 B1 | 5/2018 | Kolman et al. |
| 9,979,617 B1 | 5/2018 | Meyer et al. |
| 10,003,550 B1 | 6/2018 | Babcock et al. |
| 10,015,094 B1 | 7/2018 | Akers et al. |
| 10,127,097 B2 | 11/2018 | Talla et al. |
| 10,148,631 B1 | 12/2018 | Sokolov et al. |
| 10,212,041 B1 | 2/2019 | Rastogi et al. |
| 10,237,135 B1 | 3/2019 | Alabsi et al. |
| 10,313,211 B1 | 6/2019 | Rastogi et al. |
| 10,372,600 B2 * | 8/2019 | Mathur ............... G06F 11/3664 |
| 10,547,521 B1 | 1/2020 | Roy et al. |
| 10,594,562 B1 | 3/2020 | Rastogi et al. |
| 10,630,543 B1 | 4/2020 | Wei et al. |
| 10,693,734 B2 | 6/2020 | Rastogi et al. |
| 10,728,121 B1 | 7/2020 | Chitalia et al. |
| 10,873,541 B2 | 12/2020 | Callau et al. |
| 10,931,548 B1 | 2/2021 | Iyer et al. |
| 10,999,168 B1 | 5/2021 | Gupta et al. |
| 11,038,839 B1 | 6/2021 | Vettaikaran et al. |
| 11,038,840 B1 | 6/2021 | Vettaikaran et al. |
| 11,044,180 B2 | 6/2021 | Rastogi et al. |
| 11,171,849 B2 | 11/2021 | Rastogi et al. |
| 11,283,697 B1 | 3/2022 | Rajagopalan et al. |
| 11,290,358 B2 | 3/2022 | Basavaiah et al. |
| 11,411,825 B2 | 8/2022 | Rastogi et al. |
| 11,513,844 B1 * | 11/2022 | Aleti ................... G06F 9/4843 |
| 11,582,120 B2 | 2/2023 | Basavaiah et al. |
| 11,736,372 B2 | 8/2023 | Rastogi et al. |
| 11,792,155 B2 | 10/2023 | Rao et al. |
| 2002/0078150 A1 | 6/2002 | Thompson et al. |
| 2002/0198984 A1 | 12/2002 | Goldstein et al. |
| 2002/0198985 A1 | 12/2002 | Fraenkel et al. |
| 2003/0191837 A1 | 10/2003 | Chen |
| 2003/0236877 A1 | 12/2003 | Allan |
| 2004/0054680 A1 | 3/2004 | Kelley et al. |
| 2004/0064552 A1 | 4/2004 | Chong et al. |
| 2004/0103186 A1 | 5/2004 | Casati et al. |
| 2004/0143637 A1 | 7/2004 | Koning et al. |
| 2004/0243607 A1 | 12/2004 | Tummalapalli |
| 2005/0010578 A1 | 1/2005 | Doshi |
| 2005/0039104 A1 | 2/2005 | Shah et al. |
| 2005/0060574 A1 | 3/2005 | Klotz et al. |
| 2005/0108444 A1 | 5/2005 | Flauaus et al. |
| 2005/0120160 A1 | 6/2005 | Plouffe et al. |
| 2005/0172018 A1 | 8/2005 | Devine et al. |
| 2005/0188221 A1 | 8/2005 | Motsinger et al. |
| 2006/0167939 A1 | 7/2006 | Seidman et al. |
| 2006/0224725 A1 * | 10/2006 | Bali ................... H04L 67/1001 709/224 |
| 2006/0242282 A1 | 10/2006 | Mullarkey |
| 2006/0271677 A1 | 11/2006 | Mercier |
| 2007/0136331 A1 | 6/2007 | Hasan et al. |
| 2007/0226554 A1 | 9/2007 | Greaves et al. |
| 2008/0104230 A1 | 5/2008 | Nasuto et al. |
| 2008/0126534 A1 | 5/2008 | Mueller et al. |
| 2008/0183876 A1 * | 7/2008 | Duvur ................ H04L 67/1017 709/228 |
| 2008/0225718 A1 * | 9/2008 | Raja ................... H04L 67/1029 370/252 |
| 2009/0049524 A1 | 2/2009 | Farrell et al. |
| 2009/0154366 A1 | 6/2009 | Rossi |
| 2009/0199196 A1 | 8/2009 | Peracha |
| 2010/0030915 A1 | 2/2010 | Kiefer et al. |
| 2010/0077462 A1 | 3/2010 | Joffe et al. |
| 2010/0208742 A1 | 8/2010 | Kafle et al. |
| 2010/0279622 A1 | 11/2010 | Shuman et al. |
| 2010/0287171 A1 | 11/2010 | Schneider |
| 2010/0293296 A1 | 11/2010 | Hsu et al. |
| 2011/0126111 A1 | 5/2011 | Gill et al. |
| 2011/0196890 A1 | 8/2011 | Pfeifle et al. |
| 2012/0054266 A1 * | 3/2012 | Kazerani ............ H04L 41/5067 709/228 |
| 2012/0101800 A1 | 4/2012 | Miao et al. |
| 2012/0110185 A1 | 5/2012 | Ganesan et al. |
| 2012/0131591 A1 | 5/2012 | Moorthi et al. |
| 2012/0254443 A1 | 10/2012 | Jeda |

(56) References Cited

U.S. PATENT DOCUMENTS

| | | |
|---|---|---|
| 2012/0254444 A1 | 10/2012 | Harchol-Balter et al. |
| 2012/0291099 A1 | 11/2012 | Grube et al. |
| 2013/0013953 A1 | 1/2013 | Eck et al. |
| 2013/0086230 A1 | 4/2013 | Guerra et al. |
| 2013/0086273 A1 | 4/2013 | Wray et al. |
| 2013/0151853 A1 | 6/2013 | Azzouz et al. |
| 2013/0179289 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0211559 A1 | 8/2013 | Lawson et al. |
| 2013/0212257 A1 | 8/2013 | Murase et al. |
| 2013/0290538 A1 | 10/2013 | Gmach et al. |
| 2013/0326044 A1* | 12/2013 | Maldaner ............... H04L 41/00 709/223 |
| 2013/0326623 A1 | 12/2013 | Kruglick |
| 2013/0343213 A1 | 12/2013 | Reynolds et al. |
| 2013/0346594 A1 | 12/2013 | Banerjee et al. |
| 2014/0006862 A1 | 1/2014 | Jain et al. |
| 2014/0032785 A1 | 1/2014 | Chaudhuri et al. |
| 2014/0059179 A1 | 2/2014 | Lam |
| 2014/0101226 A1* | 4/2014 | Khandekar ............ H04L 67/56 709/203 |
| 2014/0122725 A1* | 5/2014 | Batrouni ............. H04L 67/568 709/226 |
| 2014/0143406 A1 | 5/2014 | Malhotra et al. |
| 2014/0143415 A1* | 5/2014 | Kazerani ............ H04L 43/0811 709/224 |
| 2014/0173675 A1 | 6/2014 | Ahmed et al. |
| 2014/0215058 A1 | 7/2014 | Vicat-Blanc et al. |
| 2014/0215621 A1 | 7/2014 | Xaypanya et al. |
| 2014/0229706 A1 | 8/2014 | Kuesel et al. |
| 2014/0280886 A1 | 9/2014 | Burns |
| 2014/0282160 A1 | 9/2014 | Zarpas |
| 2014/0304414 A1 | 10/2014 | Yengalasetti et al. |
| 2014/0344439 A1 | 11/2014 | Kempf et al. |
| 2014/0351226 A1 | 11/2014 | Christodorescu et al. |
| 2014/0373140 A1 | 12/2014 | Waters, Jr. et al. |
| 2015/0058265 A1* | 2/2015 | Padala .................... G06N 20/00 706/12 |
| 2015/0074679 A1 | 3/2015 | Fenoglio et al. |
| 2015/0081880 A1 | 3/2015 | Eaton et al. |
| 2015/0106325 A1 | 4/2015 | Cole et al. |
| 2015/0106523 A1 | 4/2015 | Cui et al. |
| 2015/0124640 A1 | 5/2015 | Chu et al. |
| 2015/0134831 A1 | 5/2015 | Hiroishi |
| 2015/0199219 A1 | 7/2015 | Kim et al. |
| 2015/0212829 A1 | 7/2015 | Kupershtok et al. |
| 2015/0244626 A1* | 8/2015 | Childress ............... H04L 67/10 370/235 |
| 2015/0278061 A1 | 10/2015 | Siciliano et al. |
| 2015/0288682 A1 | 10/2015 | Bisroev et al. |
| 2015/0293954 A1 | 10/2015 | Hsiao et al. |
| 2015/0295780 A1 | 10/2015 | Hsiao et al. |
| 2015/0295796 A1 | 10/2015 | Hsiao et al. |
| 2015/0358391 A1 | 12/2015 | Moon et al. |
| 2015/0370852 A1 | 12/2015 | Shastry et al. |
| 2015/0381558 A1 | 12/2015 | Tuliani |
| 2016/0036837 A1 | 2/2016 | Jain et al. |
| 2016/0064277 A1 | 3/2016 | Park et al. |
| 2016/0065609 A1 | 3/2016 | Yan |
| 2016/0087879 A1 | 3/2016 | Matsubara et al. |
| 2016/0094401 A1 | 3/2016 | Anwar et al. |
| 2016/0094410 A1 | 3/2016 | Anwar et al. |
| 2016/0094431 A1 | 3/2016 | Hall et al. |
| 2016/0094483 A1 | 3/2016 | Johnston et al. |
| 2016/0103717 A1 | 4/2016 | Dettori et al. |
| 2016/0105335 A1 | 4/2016 | Choudhary et al. |
| 2016/0125330 A1 | 5/2016 | Borah |
| 2016/0127204 A1 | 5/2016 | Ozaki et al. |
| 2016/0149832 A1 | 5/2016 | Liang et al. |
| 2016/0162701 A1 | 6/2016 | Rosenberg et al. |
| 2016/0164738 A1 | 6/2016 | Pinski et al. |
| 2016/0182399 A1 | 6/2016 | Zadka et al. |
| 2016/0217022 A1 | 7/2016 | Velipasaoglu et al. |
| 2016/0294701 A1* | 10/2016 | Batrouni ................ H04L 67/10 |
| 2016/0294722 A1 | 10/2016 | Bhatia et al. |
| 2016/0323197 A1 | 11/2016 | Guzman et al. |
| 2016/0323377 A1 | 11/2016 | Einkauf et al. |
| 2016/0359719 A1 | 12/2016 | Travostino |
| 2016/0378635 A1 | 12/2016 | Taylor et al. |
| 2016/0380975 A1 | 12/2016 | Reddy et al. |
| 2017/0041386 A1 | 2/2017 | Bhat et al. |
| 2017/0063933 A1 | 3/2017 | Shieh et al. |
| 2017/0093986 A1 | 3/2017 | Kim et al. |
| 2017/0126792 A1 | 5/2017 | Halpern et al. |
| 2017/0134481 A1 | 5/2017 | DeCusatis et al. |
| 2017/0195090 A1 | 7/2017 | Boidol et al. |
| 2017/0295207 A1 | 10/2017 | Yu et al. |
| 2017/0324555 A1 | 11/2017 | Wu et al. |
| 2017/0331907 A1 | 11/2017 | Jagannath et al. |
| 2017/0344618 A1 | 11/2017 | Horowitz et al. |
| 2018/0004582 A1 | 1/2018 | Hallenstål |
| 2018/0007126 A1* | 1/2018 | Borst ..................... H04L 47/781 |
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0063193 A1 | 3/2018 | Chandrashekhar et al. |
| 2018/0064392 A1 | 3/2018 | Ur et al. |
| 2018/0088935 A1 | 3/2018 | Church et al. |
| 2018/0089328 A1 | 3/2018 | Bath et al. |
| 2018/0136931 A1 | 5/2018 | Hendrich et al. |
| 2018/0239651 A1* | 8/2018 | Gong .................. G06F 12/0813 |
| 2018/0278570 A1 | 9/2018 | Dhanabalan |
| 2018/0287902 A1 | 10/2018 | Chitalia et al. |
| 2018/0302375 A1 | 10/2018 | Els |
| 2018/0309637 A1 | 10/2018 | Gill et al. |
| 2018/0335946 A1 | 11/2018 | Wu et al. |
| 2018/0365044 A1* | 12/2018 | Movsisyan ............. H04L 41/40 |
| 2018/0367434 A1* | 12/2018 | Kushmerick ......... H04W 72/51 |
| 2018/0367596 A1 | 12/2018 | Bache et al. |
| 2019/0014102 A1 | 1/2019 | Mathew et al. |
| 2019/0121672 A1 | 4/2019 | Ding et al. |
| 2019/0123970 A1 | 4/2019 | Rastogi et al. |
| 2019/0138420 A1* | 5/2019 | Harutyunyan ......... G06F 11/301 |
| 2019/0199790 A1 | 6/2019 | Yang et al. |
| 2019/0238505 A1 | 8/2019 | Richards et al. |
| 2019/0297014 A1 | 9/2019 | Azgin et al. |
| 2020/0014594 A1 | 1/2020 | Apiotis et al. |
| 2020/0076766 A1 | 3/2020 | Maslak |
| 2020/0136939 A1 | 4/2020 | Rastogi et al. |
| 2020/0136942 A1 | 4/2020 | Rastogi et al. |
| 2020/0142788 A1* | 5/2020 | Hu ......................... G06F 9/5077 |
| 2020/0169479 A1 | 5/2020 | Ireland |
| 2020/0204623 A1* | 6/2020 | Einkauf ............... H04L 41/0894 |
| 2020/0218571 A1* | 7/2020 | Chen ..................... H04L 41/125 |
| 2020/0264965 A1* | 8/2020 | Harutyunyan ......... H04L 41/142 |
| 2020/0287794 A1 | 9/2020 | Rastogi et al. |
| 2020/0341877 A1* | 10/2020 | Poghosyan ............. G06F 17/18 |
| 2020/0374039 A1 | 11/2020 | Rau et al. |
| 2020/0382390 A1 | 12/2020 | Basavaiah et al. |
| 2020/0382584 A1* | 12/2020 | Basavaiah ............... H04L 43/10 |
| 2021/0058453 A1* | 2/2021 | Balasubramanian ......... H04L 67/101 |
| 2021/0097183 A1 | 4/2021 | Chen |
| 2021/0119923 A1 | 4/2021 | Brown et al. |
| 2021/0216559 A1* | 7/2021 | Aghajanyan ......... G06F 3/04847 |
| 2021/0218619 A1* | 7/2021 | Harutyunyan ......... H04L 41/142 |
| 2021/0349749 A1 | 11/2021 | Guha |
| 2021/0359945 A1* | 11/2021 | Jain ..................... H04L 67/1017 |
| 2021/0373971 A1* | 12/2021 | Lu ......................... G06F 9/5088 |
| 2022/0027249 A1* | 1/2022 | Dua ..................... G06F 11/3466 |
| 2022/0046083 A1* | 2/2022 | Nair .................. H04N 21/47217 |
| 2022/0058072 A1* | 2/2022 | Poghosyan ....... G06F 18/24317 |
| 2022/0141102 A1* | 5/2022 | Rastogi .............. G06F 11/3452 709/224 |
| 2022/0147390 A1* | 5/2022 | Akinapelli .......... G06F 11/3433 |
| 2022/0231949 A1* | 7/2022 | Ramaswamy .......... H04L 45/24 |
| 2022/0237203 A1 | 7/2022 | Das et al. |
| 2022/0272041 A1 | 8/2022 | Blakey et al. |
| 2022/0286373 A1 | 9/2022 | Rajagopalan et al. |
| 2022/0309164 A1 | 9/2022 | Chiu et al. |

(56) References Cited

U.S. PATENT DOCUMENTS

| | | | |
|---|---|---|---|
| 2022/0353201 A1* | 11/2022 | Navali | H04L 41/5054 |
| 2022/0368758 A1 | 11/2022 | Suri et al. | |
| 2022/0400097 A1 | 12/2022 | Rao et al. | |
| 2022/0400098 A1 | 12/2022 | Rao et al. | |
| 2023/0018908 A1 | 1/2023 | Yue et al. | |
| 2023/0024475 A1 | 1/2023 | Mandeyam et al. | |
| 2023/0025679 A1 | 1/2023 | Mandeyam et al. | |
| 2023/0052818 A1* | 2/2023 | Jain | H04L 69/16 |
| 2023/0171171 A1 | 6/2023 | Basavaiah et al. | |
| 2024/0113950 A1* | 4/2024 | Chitalia | G06F 11/327 |

OTHER PUBLICATIONS

Author Unknown, "Autoscaling," Aug. 20, 2015, 4 pages, Amazon Web Services, retrieved from http://web.archive.org/web/20150820193921/https://aws.amazon.com/autoscaling/.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-opfilter-what-are-these-things-and-what-do-they-mean-enterprise/.

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

Liu, Feng, et al., "Monitoring of Grid Performance Based on Agent," 2007 2nd International Conference on Pervasive Computing and Applications, Jul. 26-27, 2007, 6 pages, IEEE, Birmingham, UK.

Sevcik, Peter, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

* cited by examiner

DYNAMICALLY UPDATING LOAD BALANCING CRITERIA

CLAIM OF BENEFIT TO PRIOR APPLICATIONS

This application is a continuation application of U.S. patent application Ser. No. 17/568,806, filed Jan. 5, 2022, now published as U.S. Patent Publication 2022/0368758. U.S. patent application Ser. No. 17/568,806 claims the benefit of Indian Provisional Patent Application 20/214, 1022086, filed May 17, 2021. U.S. patent application Ser. No. 17/568,806, now published as U.S. Patent Publication 2022/0368758, is incorporated herein by reference.

Large-scale clustered environments host numerous servers, sometimes on the order of thousands of servers or more. The servers may be implemented using various virtual devices such as containers, virtual machines, and the like. It may be difficult to monitor the health of the servers and manage traffic among the servers in these environments. For example, the health of a cluster of servers is determined from various factors such as individual server health, application health, and network connectivity. Conventional techniques for monitoring a group of servers and providing a network service typically involve instantiating a service provider (e.g., a monitoring service) on each application server in the cluster of servers. For clustered environments with a large number of nodes, such deployments are computationally expensive and power intensive. Thus, there is a need in the art for effective health monitoring and traffic management for large-scale clustered environments.

BRIEF SUMMARY

Some embodiments provide a method of performing load balancing for a group of machines (e.g., virtual machines, VMs, or containers) that are distributed across several physical sites (e.g., several datacenters or availability zones). The group of machines executes the same application or provides the same service in some embodiments. Also, in some embodiments, the different physical sites are in different buildings, or in different geographical regions, such as different neighborhoods, cities, states, countries, or continents.

The method of some embodiments iteratively computes (1) first and second sets of load values respectively for first and second sets of machines that are respectively located at first and second physical sites, and (2) uses the computed first and second sets of load values to distribute received data messages that the group of machines needs to process, among the machines in the first and second physical sites. The iterative computations entail repeated calculations of first and second sets of weight values that are respectively used to combine first and second load metric values for the first and second sets of machines to repeatedly produce the first and second sets of load values for the first and second sets of machines. The repeated calculation of the weight values automatedly and dynamically adjusts the load prediction at each site without user adjustment of these weight values. As it is difficult for a user to gauge the effect of each load metric on the overall load, some embodiments use machine learned technique to automatedly adjust these weight values. In some embodiments, the iterative computations include periodic computations, while in other embodiments they include event-based iterations.

The first set of load metric values quantify load on the first set of machines at the first physical site, while the second set of load metric values quantify load on the second set of machines at the second physical site. In some embodiments, the load metric values are collected for a set of machine or host computer attributes at each site. Also, in some embodiments, the set of attributes (i.e., the set of metrics) for each site is provided as a load profile for the site by one or more network administrators.

The load metric values in some embodiments are repeatedly collected from computers on which the first and second set of machines execute at the first and second physical sites. In some embodiments, the first and second sets of metric values are metric values for the same set of metrics that are collected at the two sites (e.g., when the two sites have the same load profile), while in other embodiments they are values for different sets of metrics collected at the two sites (e.g., when the two sites have different load profiles, so that one site's set of metric values comprises at least one value for a metric that does not have a value in the other site's set of metric values).

In some embodiments, first and second sets of controllers that operate respectively at first and second physical sites compute updated first and second sets of load values, and repeatedly forward these computed values to each other. In other embodiments, other computing modules, machines or appliances at these sites compute these updated load values. In still other embodiments, a centralized set of controllers or other machines/appliances compute these updated load values at one of the physical sites or at a third site.

Each set of load values in some embodiments includes only one value that expresses the overall load on its associated set of machines. In other embodiments, each set of load values includes one overall load value for each machine in the set of machines. In still other embodiments, each set of load values includes more than one value for its associated set of machines. For instance, in some embodiments, each set includes several different load values, with each load value corresponding to one load value type and at least one load value expressing an aggregation of two or more load values of the same type. Examples of load value types include latency load type, congestion load type, etc. In still other embodiments, each load value in a set of two or more load values corresponds to the load on each machine or each subset of machines in the set of machines associated with the set of load values.

From the first and second sets of load values, each set of controllers in some embodiments computes load balancing criteria for distributing the data messages across the first and second sets of machines. The load balancing criteria in some embodiments includes another set of weights that the controller sets provide to load balancers at the first and second physical sites to use in distributing the data messages across the machines in the first and second physical sites. Conjunctively, or alternatively, each controller set provides its computed set of load values to a frontend set of load balancers that distributes the data messages between the first and second physical sites. In some embodiments, the frontend load balancers include a set of DNS (domain name server) resolvers that distributes DNS requests among different DNS servers operating at different sites.

In other embodiments, the method uses the computed first and second sets of load values to more generally compute any type of load balancing criteria for performing any type of load balancing to distribute data messages between the first and second physical sites. For instance, the method in some embodiments computes first and second sets of load balancing criteria from the first and second sets of load values. Each set of load balancing criteria in some embodiments includes a set of weight values used to perform weighted round robin distribution of the data messages between the first and second physical sites.

As mentioned above, the computed load values for the different sets of machines in the different sites in some embodiments express the load on each set of machines at each site, or on individual machines at each site. In other embodiments, the computed load values for the different sets of machines express the load on each set of host computers at each site that execute the set of machines at that site, or the load on each of these computers. In still other embodiments, the computed load values for the different sets of machines express the load on the set of applications executed by the set of machines at each site.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for performing load balancing for a group of machines (e.g., virtual machines, VMs, or containers) that are distributed across a plurality of physical sites (e.g., plurality of datacenters or availability zones) and that execute the same application or provide the same service. At each of a number of the physical sites, the method of some embodiments uses two or more different types of metrics to repeatedly compute and update a set of load values that quantifies the load on the set of machines operating at that physical sites. The method uses the computed load values to distribute received data messages that the group of machines needs to process among the machines in the different physical sites.

To compute the load values, the method repeatedly collects metric values relating to the set of machines, the computers on which the machines execute and/or the applications executed by the set of machines, and uses dynamically adjusted weight values to combine the collected metric values into the computed set of one or more load values. In some embodiments, the weight values are automatedly and dynamically adjusted at each site without user input. As it is difficult for a user to gauge the effect of each load metric on the overall load, the method of some embodiments uses machine trained processes or engines (e.g., neural networks or multi-variant regression processes) to automatedly adjust the weight values.

In some embodiments, the set of load values computed and updated for each physical site includes only one value that expresses the overall load on the set of machines at that physical site. In other embodiments, each site's set of load values includes more than one value for the site's associated set of machines. For instance, in some embodiments, each set includes several different load values, with each load value corresponding to one load value type and at least one load value expressing an aggregation of two or more load values of the same type. Examples of load value types include load latency type, load congestion type, etc. In other embodiments, each load value in a set of two or more load values corresponds to the load on each machine or each subset of machines in the set of machines associated with the set of load values.

Figure 1:
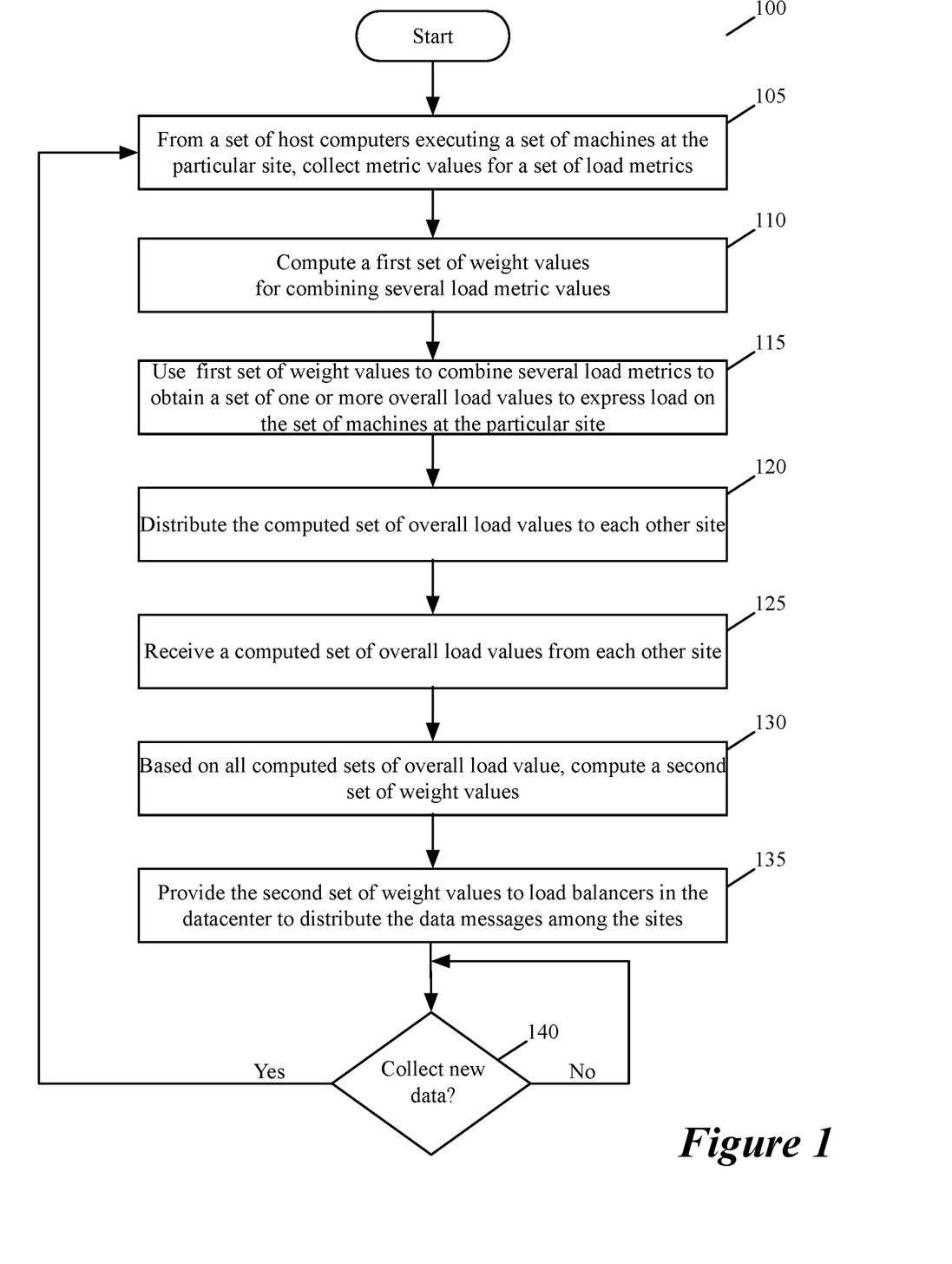
FIG. 1 illustrates a process that implements the method of some embodiments.
Figure 2:
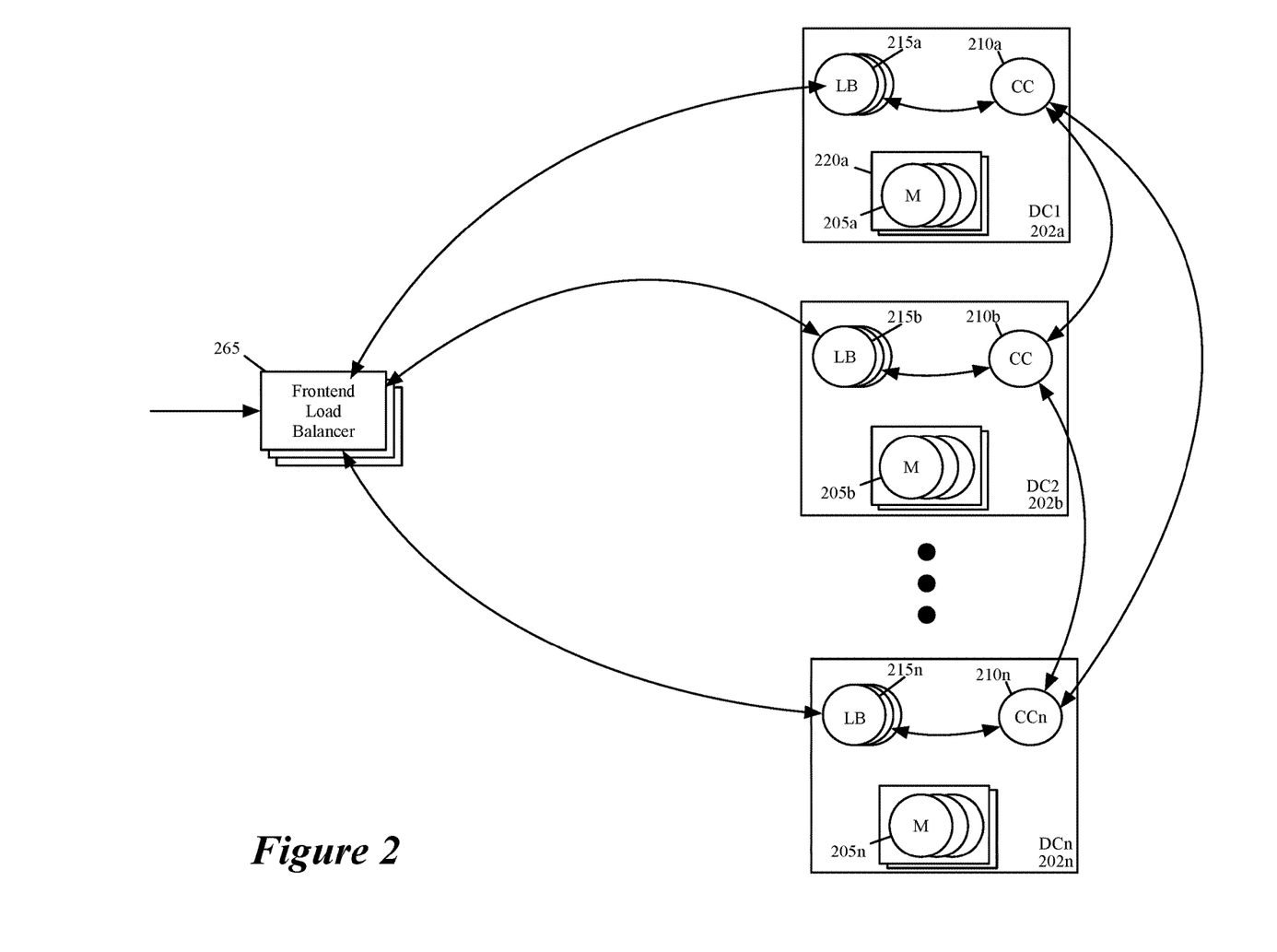
FIG. 2 illustrates an example of a system that use the process of FIG. 1.

FIG. 1 illustrates an example of a process 100 that implements the method of some embodiments of the invention. The process 100 updates load balancing criteria used to perform load balancing at a particular site at which a set of machines operate from a group of machines (e.g., VMs or containers) that are distributed across several physical sites (e.g., several datacenters or availability zones). FIG. 2 illustrates an example of a group of machines 205 executing across N different datacenters 202 in N different sites. In this example, frontend load balancers 265 distribute data message flows that are directed to the group of machines 205 to different datacenters 202. The frontend load balancers 265 operate in one of the datacenters 202 in some embodiments, while they are spread across two or more datacenters 202 in other embodiments.

In some embodiments, the process 100 is performed by a cluster 210*a* of one or more controllers at a particular site (datacenter) 202*a* at which a set of machines 205*a* execute on a set of host computers 220*a*. This same process is performed by other controller clusters 210 at each of the other N datacenters in some embodiments. The group of machines 205 execute the same application or provides the same service in some embodiments. Also, in some embodiments, the different datacenters 202 are in different buildings, or in different geographical regions, such as different neighborhoods, cities, states, countries, or continents.

In performing the process 100 iteratively, the controller cluster 210*a* computes (1) a set of load values for the set of machines 205*a* located in its datacenter 202*a*, and (2) uses the computed set of load values along with sets of load values that it receives from other controller clusters 210 in other datacenters 202 to define load balancing criteria for load balancers 215*a* to use at its datacenter 202*a* to distribute the data messages directed to the group of machines among the machines in the different sites. The iterative computations entail repeated calculations of a set of weight values that the controller cluster 210a uses to combine load metric values for its associated set of machines 205a to produce the set of load values for this set of machines, as further described below.

As shown in FIG. 1, the process 100 identifies (at 105) load metric values relating to the set of machines operating in the same datacenter. In some embodiments, the identified metric values include values relating to just the set of machines, while in other embodiments, they include load values relating to the computers on which these machines execute and/or the applications executed by the set of machines. As such, the identified metric values quantify the load on the set of machines 205a, their associated host computers 220a, and/or their associated applications.

In some embodiments, the load metric values are collected for a set of machine or host computer attributes at each site. In some embodiments, the identified set of metric values are collected by agents executing on the host computers 220a and/or load balancers 215a that forward data messages to these host computers.

Also, in some embodiments, the set of attributes (i.e., the set of metrics) for each site is provided as a load profile for the site by one or more network administrators. Some embodiments provide a pre-specified set of attributes, but allow the network administrators to modify the provided set of attributes. Examples of a set of attributes collected for each machine 205a in the set of machines of the datacenter 202a in some embodiments includes connection per second handled by each machine, packets and/or bytes per second processed by each such machine, response latency of each machine, health score computed for each machine, CPU and/or memory usage of each machine, and geo location of each machine.

The load metric values in some embodiments are repeatedly collected from computers 220a on which the set of machines 205a execute. In some embodiments, the metric values for the same set of metric (attributes) are collected at each sites (e.g., when all the sites have the same load profile), while in other embodiments metric values for different sets of metrics can be collected at different sites (e.g., when the two sites have different load profiles).

After identifying (at 105) a set of load metric values, the process 100 dynamically computes (at 110) a first set of weight values for combining the collected metric values into a computed set of one or more load values. In some embodiments, the network administrators do not specify this set of weight values as it is difficult for a user to gauge the effect of each load metric on the overall load. Hence, in these embodiments, the process uses machine trained processes and/or engines to automatedly compute the weight values used to produce the set of load values that quantify the load on the set of machines 205a. Examples of such machine trained processes or engines include neural networks and multi-variant regression processes, and will be further explained below.

At 115, the process uses the weight values computed at 110 to compute a set of one or more load values that express the load on the set of machines 205a at the datacenter 202a. Each set of load values in some embodiments includes only one value that expresses the overall load on its associated set of machines. In such cases, the following equation is used in some embodiments to express the overall load L on the set of machines $$L = \Sigma_1^Y w1*m1 + w2*m2\ldots + wZ*mZ,$$

where Y is the number of machines in the set, w1, w2, ... wZ are weight values associated with Z specified metrics, and m1, m2, ... mZ are metric values collected for the Z metrics.

In other embodiments, each set of load values includes one overall load value for each machine in the set of machines 205a. For instance, the following equation is used in some embodiments to express the overall load L on the set of machines $$L_y = w1*m1 + w2*m2 + \ldots wZ*MZ$$

where y is the number of a particular machines in the set machines 205a, w1, w2, ... wZ are weight values associated with Z specified metrics, and m1, m2, ... mZ are metric values collected for the Z metrics from the machine y.

In still other embodiments, the computed set of load values includes more than one value for the set of machines 205a. For instance, in some embodiments, the computed set includes several different load values, with each load value corresponding to one load value type and at least one load value expressing an aggregation of two or more load values of the same type. Examples of load value types include latency load type, congestion load type, etc. In still other embodiments, each load value in a set of two or more load values corresponds to the load on each machine or each subset of machines in the set of machines associated with the set of load values.

After computing the set of load values, the process 100 forwards (at 120) its computed set of load values to other controller clusters 210 of other datacenters 202. It also receives (at 125) the set of load values computed by the other controller clusters 210 to express the load of the set of machines 205 at their respective datacenters 202. This exchange of computed sets of load values is through an intervening network (e.g., the Internet or dedicated wide area network) that connects the datacenters in some embodiments.

Based on its computed set of load values and the set of load values that it receives from other controller clusters, the process 100 computes (130) a set of load balancing criteria for its associated load balancer cluster 215a. The process 100 then forwards (135) through its datacenter network (e.g., through the datacenter's local area network) the computed set of load balancing criteria to the load balancers in the load balancer cluster 215a of its datacenter. The load balancers then use the computed load balancing criteria to distribute the data messages across the sets of machines at its datacenter or across the machines in all of the datacenters.

The computed load balancing criteria in some embodiments includes another set of weights that the controller set 210a provides to load balancers 215a at its site. The load balancers use this set of weight values to perform round robin load balancing operations to distribute the data messages that they receive between the machines in the set of machines 205a. For instance, when the set of machines 205 include five machines, the computed set of weight values include five weights, such as 1, 3, 3, 1, 2. Based on these five weight values, a load balancer in the load balancer set 215 would distribute ten new flows as follows: the first flow to first machine, the next three flows to the second machine, the next three flows to the third machine, the next flow to the fourth machine, and the last two flows to the fifth machine. The load balancer uses the same sequence to distribute each of the successive ten new data message flows after the first ten data message flows.

After providing the load balancing criteria to the load balancers at 135, the process 100 transitions to wait state 140, where it remains until a new set of collected load metric values need to be processed. At this point, it returns to 105 to identify the new set of load metric values and then to 110 to compute a set of weight values to combine this set of load metric values. The process 100 then repeats its operations 115-140 for the new set of load metric values and the newly computed set of weight values.

Figure 3:
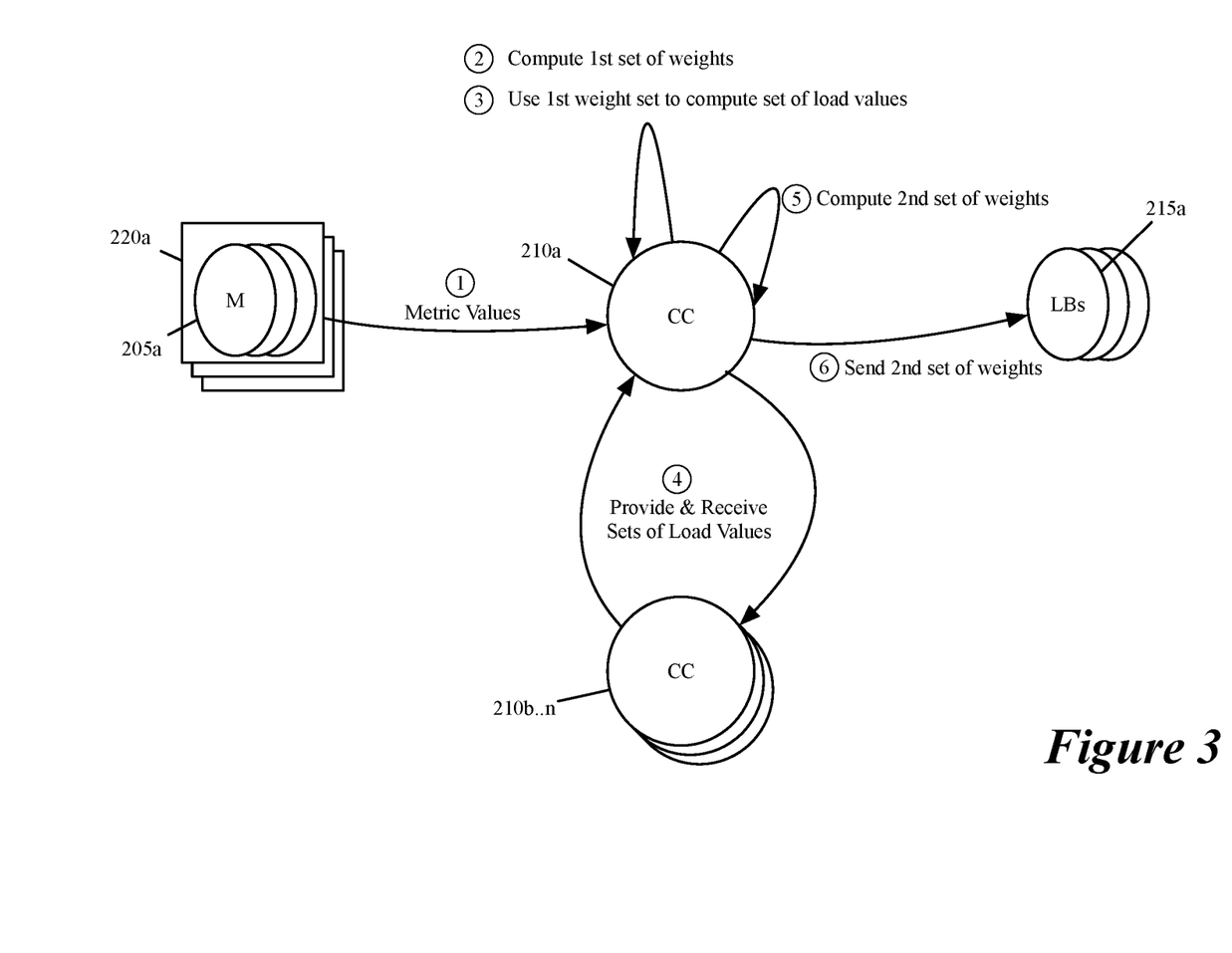
FIG. 3 presents an illustration of one exemplary sequence of operations performed by a controller cluster in some embodiments.

FIG. 3 presents an illustration of one exemplary sequence of operations performed by the controller cluster 210a in some embodiments. As shown, the controller 210a initially collects load metric values from the host computers 220a on which its associated set of machines 205a execute in its datacenter. The controller cluster 210a then computes a first set of weight values based on the collected set of metric values. The controller cluster then computes a set of load values that express the load on the set of machines 205a.

Next, the controller cluster receives several sets of load values computed by controller clusters at other datacenters for the set of machines at the other datacenters. From the sets of load values that it computes and receives, the controller cluster then computes a second set of weight values, which it then provides to the load balancers in its datacenter to use to distribute the data messages or the data message flows that they receive among the machines in the set of machines at the datacenter. In other embodiments, the second set of weight values would include weights for machines in two or more datacenters, and the load balancers 215a would use these weight values to distribute the data messages or the data message flows among the machines in the two or more datacenters.

Figure 4:
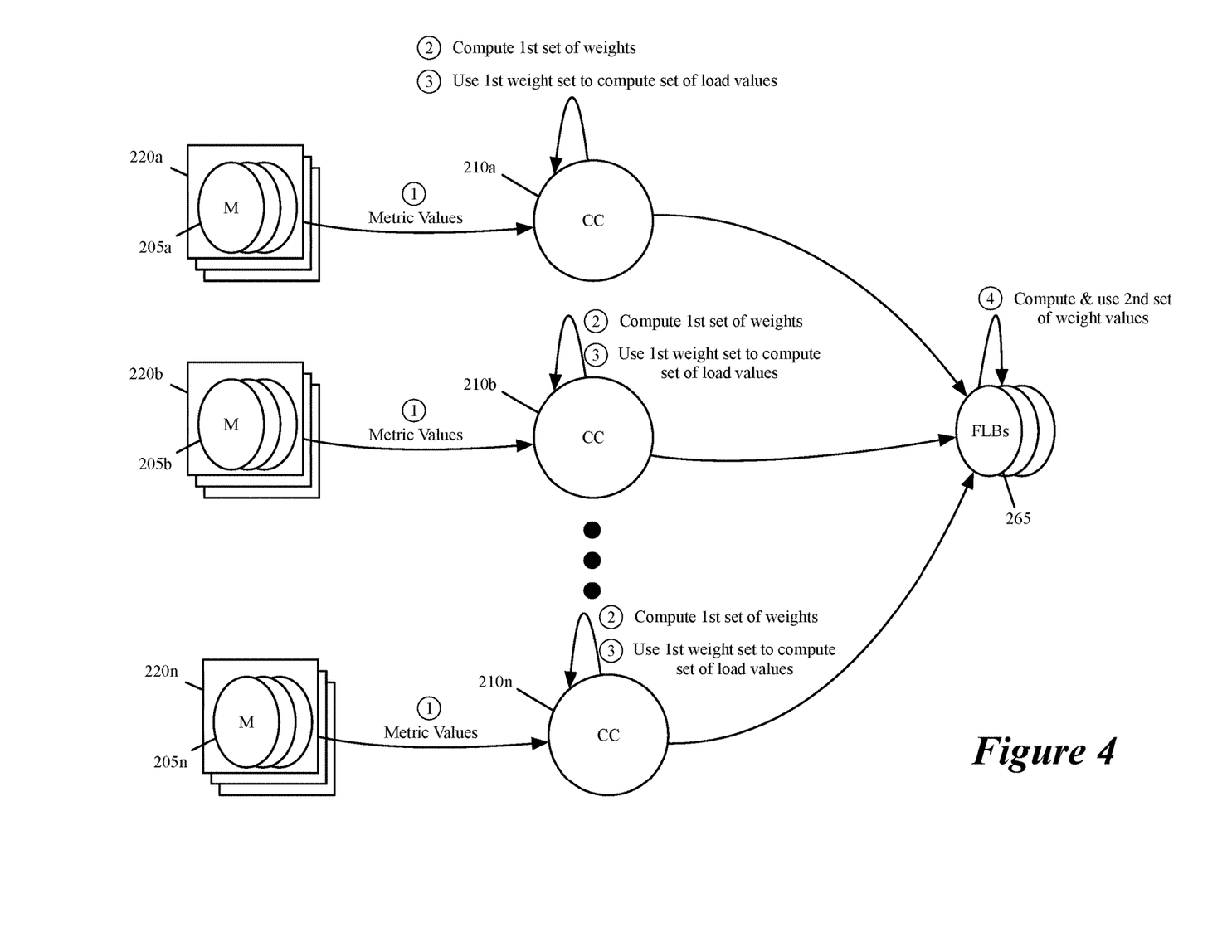
FIG. 4 presents an illustration of another exemplary sequence of operations performed by a controller cluster in some embodiments.

In other embodiments, the controller clusters provide the load values that they compute to the frontend load balancers 265, which they then use to distribute the data message load among the different datacenters. FIG. 4 illustrates an example of this. In this example, each controller cluster in each datacenter (1) collects load metric values from the host computers 220 on which its associated set of machines 205 execute in its datacenter, (2) computes a first set of weight values based on the collected set of metric values, and (3) computes a set of load values that express the load on the set of machines.

Each controller cluster then provides its computed set of load values to the frontend load balancers 265. From these sets of load values, the frontend load balancers then compute a second set of weight values. The frontend load balancers then use the second set of weight values to distribute the data messages or the data message flows that they receive to the different datacenters 202 so that the machines at these datacenters can process these flows. In other embodiments, one of the controller clusters 210 or another controller cluster collects the load values computed by all of the controller clusters 210, and generates the second set of weight values, which it then provides to the frontend load balancers to use.

One of ordinary skill will realize that other embodiments perform the process 100 differently. For instance, in several embodiments described above, different sets of controllers operate respectively at different physical sites to compute updated sets of load values, and repeatedly forward these computed values to each other. In other embodiments, other computing modules, machines or appliances at these sites compute these updated load values. In still other embodiments, a centralized set of controllers or other machines/appliances compute these updated load values at one of the physical sites or at a third site.

Figure 5:
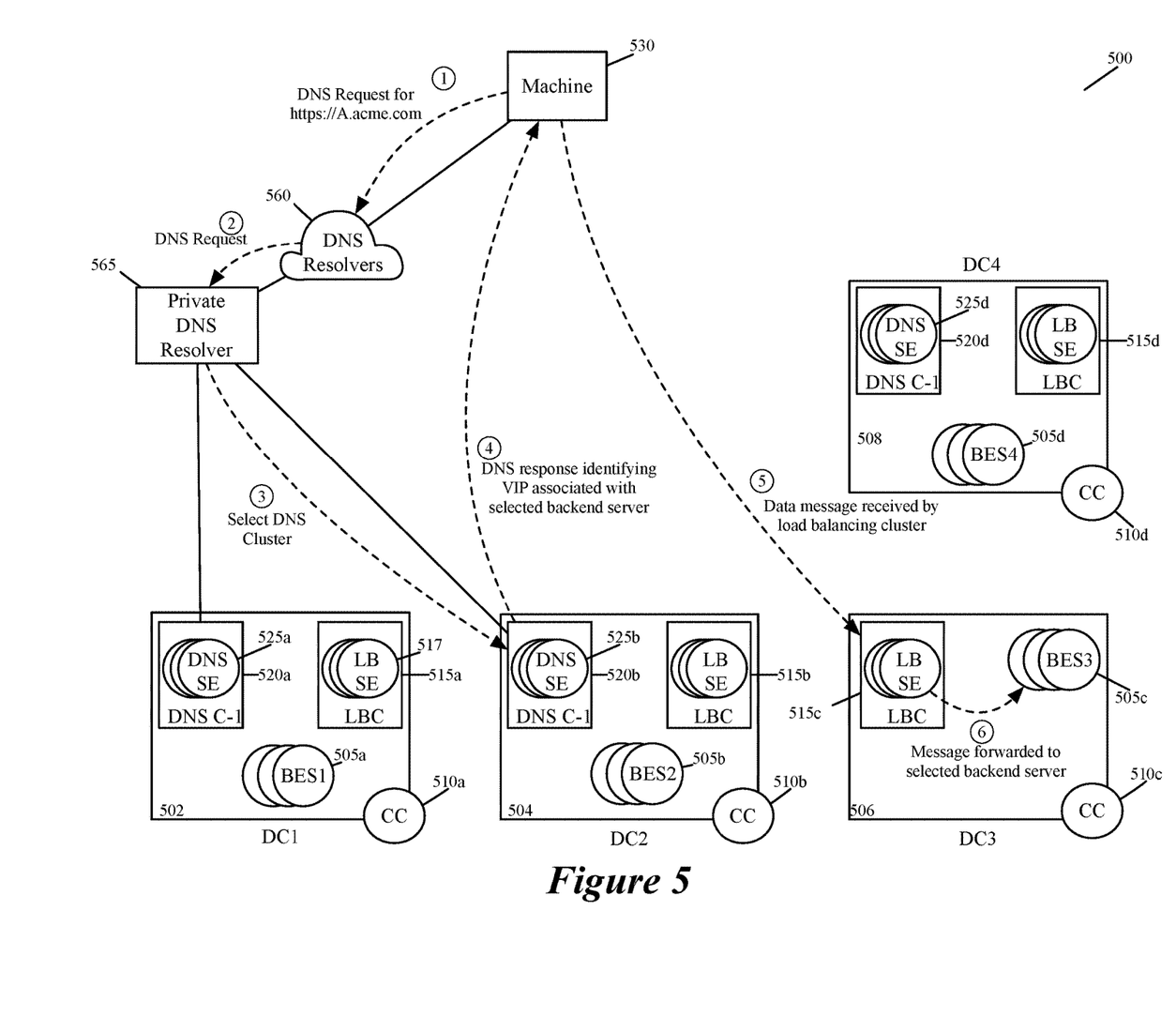
FIG. 5 illustrates an example for a deployment of the load calculation method of some embodiments.

FIG. 5 illustrates another exemplary deployment of the load calculation method of some embodiments. In this example, the method of some embodiments is used to perform health monitoring for resources associated with a global server load balancing (GSLB) system 500. This system is implemented by several domain name system (DNS) servers that perform DNS services for resources located at several geographically separate sites. In GSLB systems, health monitoring typically involves tacking one parameter (e.g., responsiveness to ping messages). However, in the example illustrated in FIG. 5, the health of the GSLB resources is gauged by computing load values that are based on multiple metric values and based on dynamically adjusted weight values that are used to combine these metric values.

As shown, the GSLB system 500 includes backend application servers 505 that are deployed in four datacenters 502-508, three of which are private datacenters 502-506 and one of which is a public datacenter 508. The datacenters in this example are in different geographical sites (e.g., different neighborhoods, different cities, different states, different countries, etc.). A cluster of one or more controllers 510 are deployed in each datacenter 502-508. Like the controllers 210, the controllers 510 perform the load value calculations described above by reference to FIGS. 1-4.

Each datacenter also has a cluster 515 of load balancers 517 to distribute the data message load across the backend application servers 505 in the datacenter. In this example, three datacenters 502, 504 and 508 also have a cluster 520 of DNS service engines 525 to perform DNS operations to process (e.g., to provide network addresses for domain names provided by) for DNS requests submitted by machines 530 inside or outside of the datacenters. In some embodiments, the DNS requests include requests for fully qualified domain name (FQDN) address resolutions.

FIG. 5 illustrates the resolution of an FQDN that refers to a particular application "A" that is executed by the servers of the domain acme.com. As shown, this application is accessed through https and the URL "A.acme.com". The DNS request for this application is resolved in three steps. First, a public DNS resolver 560 initially receives the DNS request and forwards this request to the private DNS resolver 565 of the enterprise that owns or manages the private datacenters 502-506. The private DNS resolver 565 performs the job of a frontend load balancer, like the ones described above by reference to FIGS. 2-4.

Second, the private DNS resolver 565 selects one of the DNS clusters 520. This selection is random in some embodiments. In other embodiments, this selection is based on a set of load balancing criteria that distributes the DNS request load across the DNS clusters 520. The set of load balancing criteria in some of these embodiments are load balancing criteria that are computed based on the load and weight values calculated based on the methodology described above by references to FIGS. 1, 2 and 4. In the example illustrated in FIG. 5, the private DNS resolver 565 selects the DNS cluster 520b of the datacenter 504.

Third, the selected DNS cluster 520b resolves the domain name to an IP address. In some embodiments, each DNS cluster includes multiple DNS service engines 525, such as DNS service virtual machines (SVMs) that execute on host computers in the cluster's datacenter. When a DNS cluster 520 receives a DNS request, a frontend load balancer (not shown) in some embodiments selects a DNS service engine 525 in the cluster to respond to the DNS request, and forwards the DNS request to the selected DNS service engine. Other embodiments do not use a frontend load balancer, and instead have a DNS service engine serve as a frontend load balancer that selects itself or another DNS service engine in the same cluster for processing the DNS request.

The DNS service engine 525b that processes the DNS request then uses a set of criteria to select one of the backend server clusters 505 for processing data message flows from the machine 530 that sent the DNS request. The set of criteria for this selection in some embodiments is based on the weight values that are computed according to the methodology that was described above b references to FIGS. 1-3. Also, in some embodiments, the set of criteria include load balancing criteria that the DNS service engines use to distribute the data message load on backend servers that execute application "A."

In the example illustrated in FIG. 5, the selected backend server cluster is the server cluster 505c in the private datacenter 506. After selecting this backend server cluster 505c for the DNS request that it receives, the DNS service engine 525b of the DNS cluster 520b returns a response to the requesting machine. As shown, this response includes the VIP address associated with the selected backend server cluster 505. In some embodiments, this VIP address is associated with the local load balancer cluster 515c that is in the same datacenter 506 as the selected backend server cluster.

After getting the VIP address, the machine 530 sends one or more data message flows to the VIP address for a backend server cluster 505 to process. In this example, the data message flows are received by the local load balancer cluster 515c. In some embodiments, each load balancer cluster 515 has multiple load balancing engines 517 (e.g., load balancing SVMs) that execute on host computers in the cluster's datacenter.

When the load balancer cluster receives the first data message of the flow, a frontend load balancer (not shown) in some embodiments selects a load balancing service engine 517 in the cluster to select a backend server 505 to receive the data message flow, and forwards the data message to the selected load balancing service engine. Other embodiments do not use a frontend load balancer, and instead have a load balancing service engine in the cluster that serves as a frontend load balancer that selects itself or another load balancing service engine in the same cluster for processing the received data message flow.

When a selected load balancing service engine 517 processes the first data message of the flow, this service engine uses a set of load balancing criteria (e.g., a set of weight values calculated according to the methodology of FIGS. 1-3) to select one backend server from the cluster of backend servers 505c in the same datacenter 506. The load balancing service engine then replaces the VIP address with an actual destination IP (DIP) address of the selected backend server, and forwards the data message and subsequent data messages of the same flow to the selected back end server. The selected backend server then processes the data message flow, and when necessary, sends a responsive data message flow to the machine 530. In some embodiments, the responsive data message flow is through the load balancing service engine that selected the backend server for the initial data message flow from the machine 530.

Metrics for different attributes (defined in load profile) are collected from different sites. For a collected set of metrics, some embodiments analyze the metric set to determine how individual attributes affects the performance of the application that is being load balanced. Some embodiments use multi variant regression analysis that uses a formula that expresses how different factors in variables respond simultaneously to changes in overall performance of the application. For instance, some embodiments use CPU usage on the service engines as a measure for application performance. For real time content streaming application, overall latency can be used as a measure for application performance conjunctively or alternatively with CPU usage.

The controller cluster in some embodiments feeds a collected set of metrics from different site into the algorithm to determine a set of weights. Once the set of weights have been determined, the controller cluster use this set of weights for its next iteration to compute the set of weights. During that time, the controller cluster continues gathering sample data set for the following iteration. In this manner, the weights are refreshed periodically to cater to changes in application behavior.

Consider a scenario where an application follows a time of day pattern. For example, the application has excessive load between 9 AM to 10 AM where everyone connects to work or excessive load at top of the hour like online collaboration tool (webex) where employees connect to meetings. To address these use case, the controller cluster retrains the weights after every window.

Multi-variant regression analysis of some embodiments computes weights based on an assumption each load variable has a linear relationship with the application performance. That might not be the case in all scenarios, as some load variable might have a polynomial impact on performance. To address this, some embodiments use polynomial regression or neural networks to dynamically adjust weights.

The above-described methodology for producing load values has several advantages. It allows load values to be custom specified and modified for different backend applications. For example, the load values for applications with real-time content streaming should be heavily biased towards reducing latencies. On the other hand, the load values for applications for regular content streaming (e.g., applications like Netflix) should be biased towards distributing bandwidth consumption. The load values for applications with less content and more connections (e.g., applications like ticket booking applications) should be biased towards distributing connection load. The load values for applications with localized data (like news applications) should be biased towards geographic locations as it is desirable for the content to be served form local servers.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
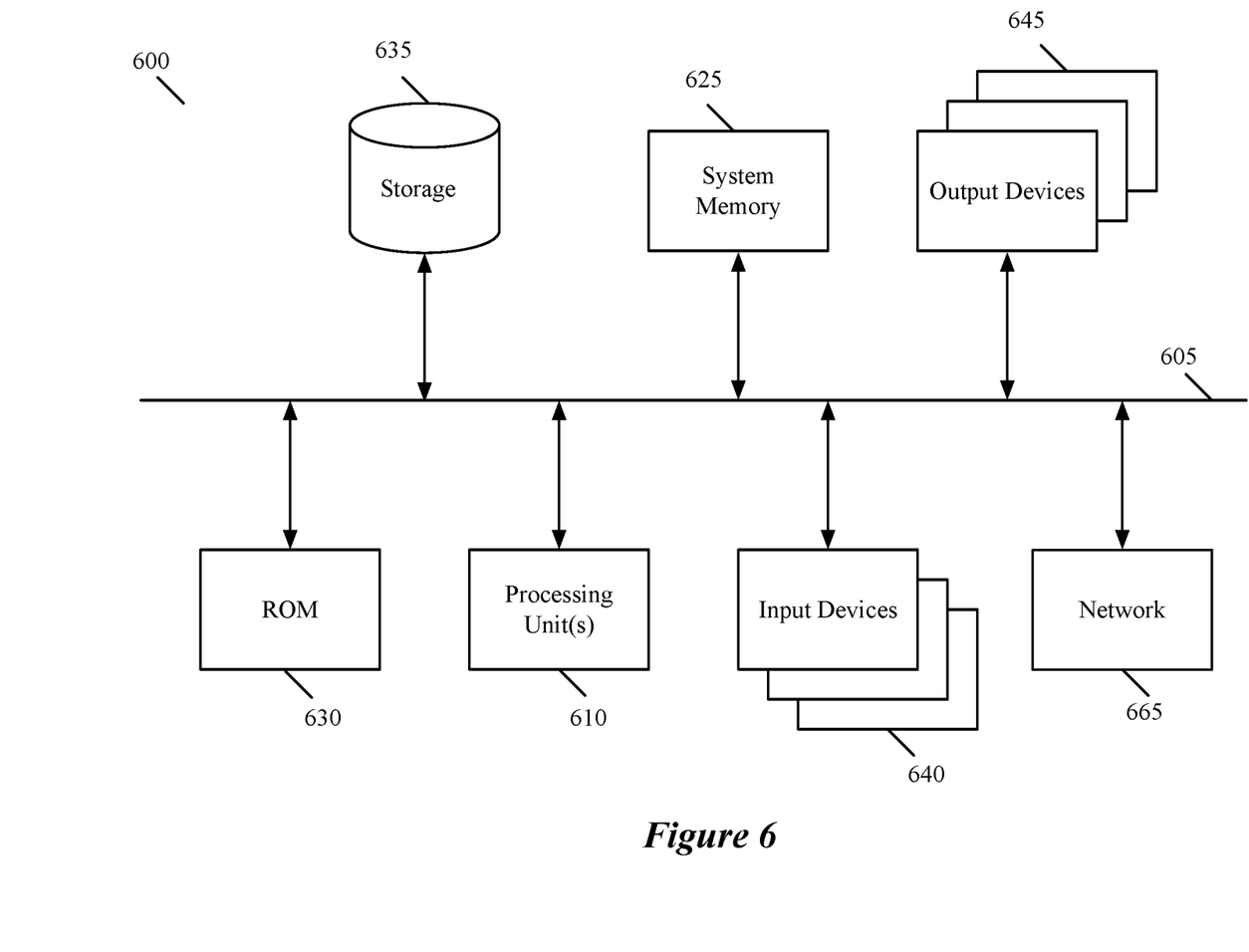
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet), or a network of networks (such as the Internet). Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing load balancing for a plurality of machines that are distributed across a plurality of physical sites, the method comprising
at each particular site:
collecting a set of load metrics that quantify load on a set of machines at the particular site; and
computing a set of load values from the set of load metrics collected at the particular site and a set of weight values that are used to produce an aggregated blend of the collected set of load metrics; and
using the sets of load values computed at the plurality of sites to distribute received data message flows among the machines in the plurality of sites;

wherein the sets of metric values collected at two different sites are different in that one site collects a value for a metric that is excluded in the set of metrics for which values are collected at another site.

2. The method of claim 1, wherein using the computed sets of load values at the plurality of sites comprises:
computing load balancing criteria based on the computed sets of load values; and
using the computed load balancing criteria to distribute the received data message flows.

3. The method of claim 2, wherein the load balancing criteria comprise weight values used to perform weighted round robin distribution of the data message flows.

4. The method of claim 1 further comprising providing, from each particular site, the set of load values to a set of load balancers that compute and use the load balancing criteria.

5. The method of claim 1, wherein each particular site computes a set of load balancing criteria and provides the computed set of load balancing criteria to a set of load balancers to use.

6. The method of claim 1, wherein a set of controllers at each site compute the set of load values at the particular site.

7. The method of claim 6 further comprising calculating, at the set of controllers for each particular site, the set of weight values used to compute the set of load values from the set of load metrics collected at the particular site.

8. The method of claim 1 further comprising iteratively collecting load metrics from computers on which the machines execute.

9. The method of claim 1, wherein the sets of metric values collected at the different sites are similar.

10. A non-transitory machine readable medium storing a program for performing load balancing for a plurality of machines that are distributed across a plurality of physical sites, the program for execution by at least one processing unit of a computer at a particular site, the program comprising sets of instructions for:
collecting a set of load metrics that quantify load on a set of machines at the particular site; and
computing a set of load values from the set of load metrics collected at the particular site and a set of weight values that are used to produce an aggregated blend of the collected set of load metrics; and
receiving sets of load values computed at other sites;
using the sets of load values computed at the particular site and at other sites to distribute received data message flows among the machines in the plurality of sites;
wherein the sets of metric values collected at two different sites are different in that one site collects a value for a metric that is excluded in the set of metrics for which values are collected at another site.

11. The non-transitory machine readable medium of claim 10, wherein the set of instructions for using the computed sets of load values at the plurality of sites comprises sets of instructions:
computing load balancing criteria based on the computed sets of load values; and
using the computed load balancing criteria to distribute the received data message flows.

12. The non-transitory machine readable medium of claim 11, wherein the load balancing criteria comprise weight values used to perform weighted round robin distribution of the data message flows.

13. The non-transitory machine readable medium of claim 10, wherein the program further comprises a set of instructions for providing, from each particular site, the set of load values to a set of load balancers that compute and use the load balancing criteria.

14. The non-transitory machine readable medium of claim 10, wherein each particular site computes a set of load balancing criteria and provides the computed set of load balancing criteria to a set of load balancers to use.

15. The non-transitory machine readable medium of claim 10, wherein a set of controllers at each site compute the set of load values at the particular site.

16. The non-transitory machine readable medium of claim 15, wherein the program further comprises a set of instructions for calculating, at the set of controllers for each particular site, the set of weight values used to compute the set of load values from the set of load metrics collected at the particular site.

17. The non-transitory machine readable medium of claim 10, wherein the program further comprises a set of instructions for iteratively collecting load metrics from computers on which the machines execute.

18. The non-transitory machine readable medium of claim 10, wherein the sets of metric values collected at the different sites are similar.

* * * * *